May 15, 1951     D. BIERMANN     2,553,128
MECHANISM FOR CONTROLLING PROPELLERS
Filed June 13, 1946     3 Sheets-Sheet 1
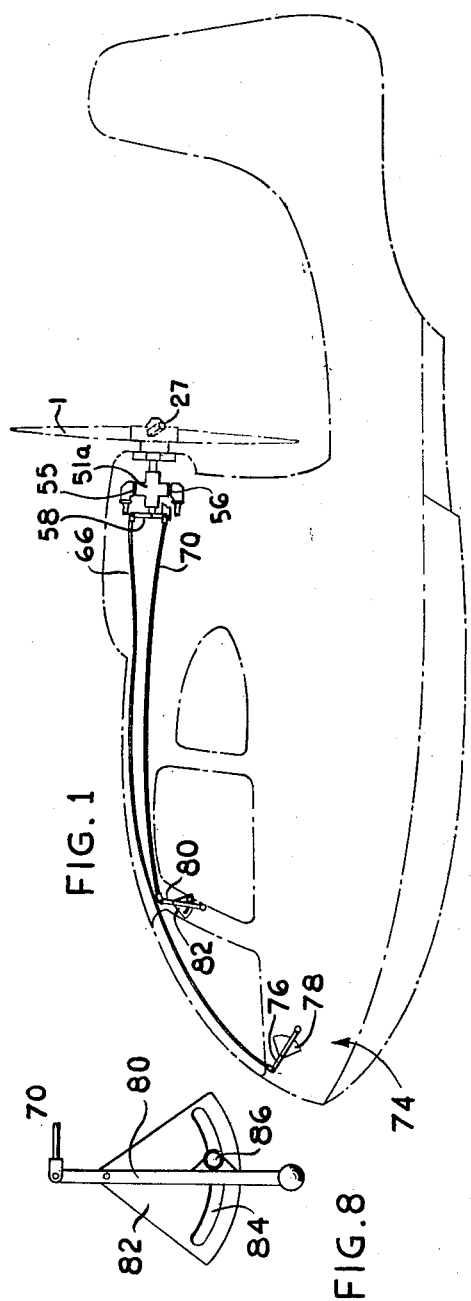
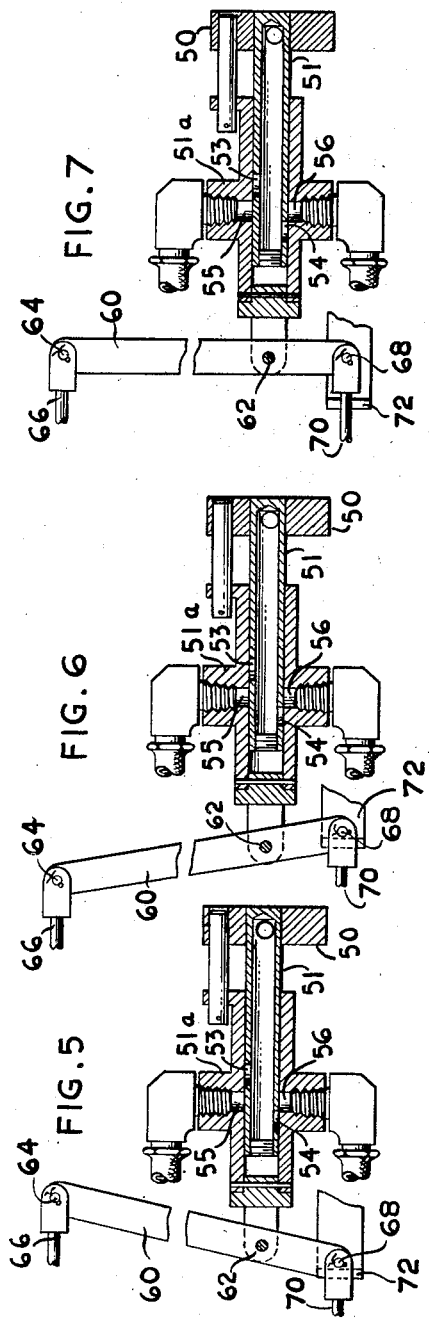
INVENTOR
DAVID BIERMANN
BY
Toulmin & Toulmin
ATTORNEYS May 15, 1951 — D. BIERMANN — 2,553,128
MECHANISM FOR CONTROLLING PROPELLERS
Filed June 13, 1946 — 3 Sheets-Sheet 2
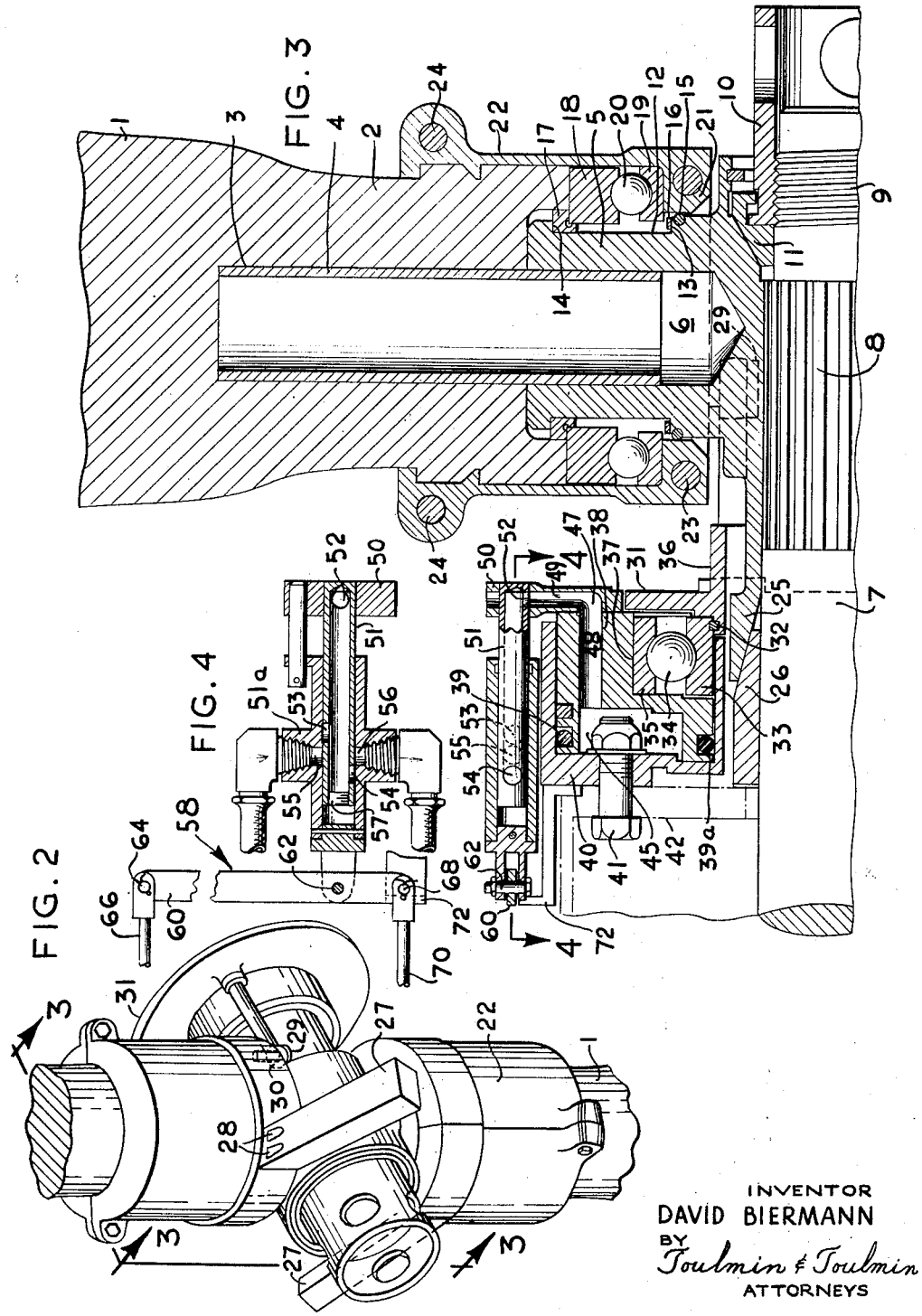
INVENTOR
DAVID BIERMANN
BY
Toulmin & Toulmin
ATTORNEYS May 15, 1951 D. BIERMANN 2,553,128
MECHANISM FOR CONTROLLING PROPELLERS
Filed June 13, 1946 3 Sheets-Sheet 3
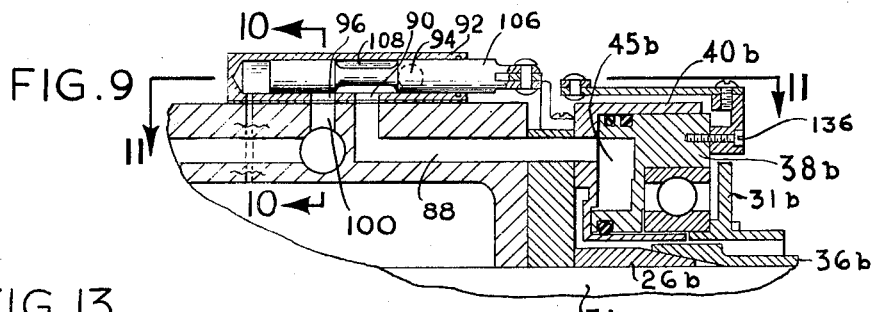
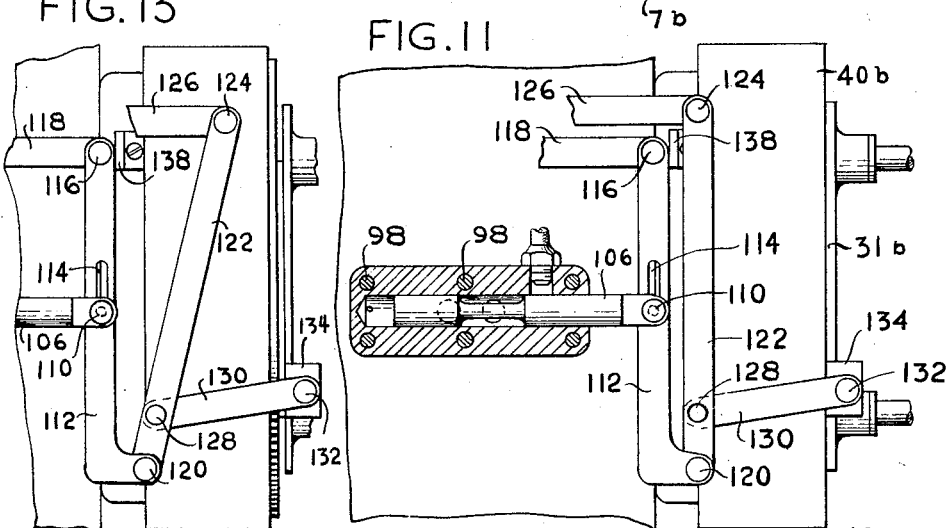
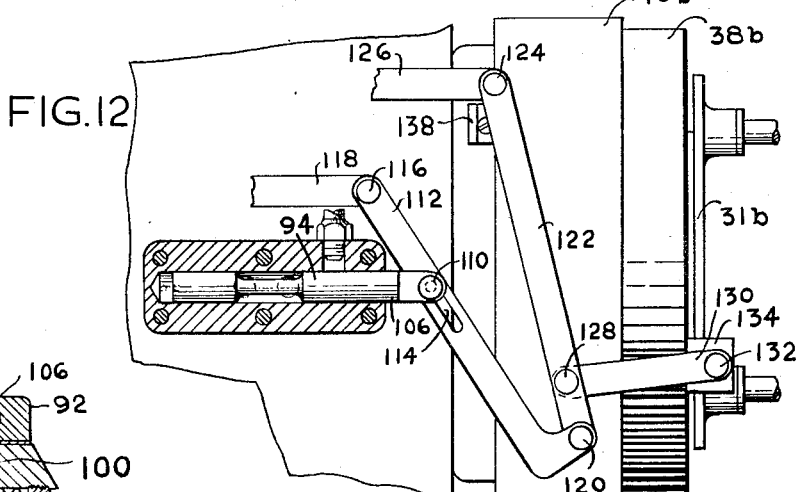
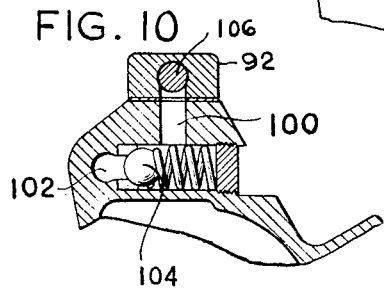
INVENTOR
DAVID BIERMANN
BY
Toulmin & Toulmin
ATTORNEYS Patented May 15, 1951

2,553,128

UNITED STATES PATENT OFFICE 2,553,128

MECHANISM FOR CONTROLLING PROPELLERS

David Biermann, Piqua, Ohio, assignor to Hartzell Industries, Inc., Piqua, Ohio, a corporation of Ohio Application June 13, 1946, Serial No. 676,432

8 Claims. (Cl. 170—160.37)

This invention relates to aircraft, and particularly to method and mechanism for controlling the pitch of adjustable pitch propellers.

The particular object of this invention is to provide in combination an adjustable pitch propeller, valve mechanism for controlling the supply of actuating fluid to the propeller pitch adjusting device and a control linkage therefor remotely operated from the plane cabin.

Another object is to provide in combination with a propeller which is adjustable to both positive and negative pitch positions a hydraulic actuating mechanism for adjusting the propeller pitch and valve means controlled from the cabin of the plane to control the supply of fluid to the actuating mechanism.

Still another object is to provide independent actuating means for controlling the positive and negative pitch positions of an adjustable pitch propeller so that there is no possibility of the pilot making an improper adjustment.

It is also an object to provide an adjustable pitch propeller having an adjusting mechanism controlled by linkage extending to the pilot's cabin, and having separate levers for controlling the positive and negative pitch positions, the lever controlling the negative pitch being normally locked in position.

Still another object is to provide a differential lever mechanism for controlling the pitch of an adjustable pitch propeller such that the propeller may be adjusted in positive pitch very accurately, and adjusted into negative pitch very quickly.

It is also an object to provide a control linkage for adjusting a propeller into positive and negative pitch positions having independent levers which are movable independently to effect fine adjustment of the propeller in positive pitch, and rapid adjustment of the propeller into negative pitch.

These and other objects and advantages will become more apparent upon reference to the following description and the accompanying drawings in which:

Figure 1 is a view of a plane illustrating the location of the propeller adjusting mechanism, the actuating linkage therefor and the operating levers in the pilot's cabin;

Figure 2 is a fragmentary perspective view of an adjustable pitch propeller adapted for being controlled by the mechanism of this invention;

Figure 3 is a vertical section through the propeller and hydraulic actuating mechanism therefor and is indicated substantially by the plane 3—3—3 in Figure 2;

Figure 4 is a plan section taken on the line 4—4 and illustrates the porting and lever arrangement in connection with the hydraulic control valve associated with the actuating mechanism for the propeller;

Figures 5, 6 and 7 are views similar to Figure 4 but show the control valve, respectively, in minimum positive, maximum positive and negative pitch positions;

Figure 8 is a view showing one form of lock lever which may be employed in connection with the negative pitch control means;

Figure 9 is a fragmentary view showing a modified arrangement of control valve;

Figure 10 is a section taken on the line 10—10 of Figure 9 and shows the means of supplying pressure fluid to the valve bore;

Figure 11 is a plan section indicated by the line 11—11 on Figure 9 and shows the mechanism in maximum positive pitch position;

Figure 12 is a view similar to Figure 11 showing the mechanism in maximum negative pitch position; and Figure 13 is a view showing the mechanism moved toward minimum pitch position from the position shown in Figure 11.

General arrangement

According to this invention there is provided an airplane propeller which is adjustable from a positive pitch position into a negative pitch position. The propeller is provided with counterweights which are responsive to rotation of the propeller by the drive shaft to create a centrifugal force. This centrifugal force has a moment arm about the axis of the propeller blades by which it exerts a turning torque on the said blades tending to move them toward increased pitch position.

For moving the propeller blades toward reduced positive pitch position or into negative pitch, there is provided a hydraulic actuating system which is operable to oppose the aforementioned moment of centrifugal weights. A servo-valve is connected with the hydraulic actuating mechanism so that the propeller is positively retained in any position of adjustment so long as there is a supply of pressure fluid to the said valve.

For actuating the control member of the servo-valve, there is a lever system which is controlled from the cabin of the plane by the pilot. This lever system consists of a first lever means having a high ratio so that the said control member can be moved in fine adjustment while adjusting the propeller in positive pitch; and a second lever means having a low ratio so that the propeller can be adjusted quickly from any position into negative pitch.

The aforementioned lever means are independently controlled by separate levers in the plane cabin. The one for controlling the propeller in positive pitch is located closely adjacent the pilot to be readily manipulated. The lever controlling the negative pitch position is positioned to be less available for actuation, as for example on the roof of the cabin, and is normally locked in position by a suitable means. Thus, while the pilot is able to adjust the propeller in positive pitch at any time, it is necessary to unlock one of the control levers before the propeller can be moved into negative pitch. This prevents the accidental shifting of the propeller in the wrong direction during the critical period of take-off or initial climbing of the craft.

Structural arrangement

Referring to the drawings in detail, 1 designates a propeller blade having a shank or hub 2 recessed at 3 for receiving a driving shaft or sleeve 4, the other end of which is mounted in the hub 5 in a recess 6. The hub 5 is mounted upon the engine shaft 7 by the spline portion 8. The threaded end of the shaft 9 is provided with a lock nut 10 which interlocks with the hub 5 through the interlocking cone 11. The hub 5 is provided with a groove 12 having a lower shoulder 13 and an upper shoulder 14. Mounted in the hub adjacent to the lower shoulder 13 is a sealing ring 15, and above it a snap ring 16. The upper shoulder 14 carries a split ring 17, which in turn engages with the upper ball race 18. The remainder of the ball bearing consists of the race 19 and balls 20. This bearing is held in position by being engaged by the flange 21 of the clamping ring 22 which is made in two parts and held together as shown in Figure 3 by the lower retaining bolts 23 and the upper retaining bolts 24.

In assembly of the mechanism just described, the procedure is as follows. Seal 15 is slipped past its groove. The snap ring 16 is slipped into the groove normally occupied by seal 15. The ball bearing consisting of the parts 18, 19 and 20 is slipped over the sleeve 5. The split ring 17 is then placed in position. Snap ring 16 is then worked into position between shoulder 13 and race 19, after which the seal 15 is located in its groove. Thereafter, the shank 2 of the blade 1 is mounted upon the driving sleeve 4. The split sleeve 22 is then placed around the assembly, which causes the upper race 18 to fit snugly against the ring 17, which in turn fits against the shoulder 14. The bolts 23 and 24 are then attached and the halves of the clamp 22 are bolted together.

The hub 5 is provided at the left-hand end towards the engine with a cone sleeve 25 which engages with a cone locking ring 26 so that the hub is locked between this cone lock 25—26 and the cone locking ring 11. These details form no essential part of the invention but are recited in order to explain one type of mechanism for mounting the driving hub 5 on the engine shaft.

Counterbalancing mechanism

One of the clamping halves of the clamp 22 is provided with a counterbalancing weight designated at 27 which extends outwardly and towards the axis of the drive shaft 7. This counterbalancing block is mounted by the screws 28 upon the inner end of one half of the clamp 22. It is substantially radially disposed with respect to the longitudinal axes of the propeller blades. These counterbalancing weights move bodily with the blades as they rotate about the longitudinal axis of the shaft 7, and under the influence of centrifugal force, tend to move the propeller blades in one direction. This direction is toward high pitch, and a hydraulic mechanism to be hereinafter described is utilized for decreasing the pitch.

It is generally preferable to have the hydraulic mechanism reduce the pitch so that if the fluid pressure fails, the pitch will remain at the high limit. Thus, hydraulic pressure decreases pitch, while the centrifugal moment of the counterweight increases pitch.

First embodiment of hydraulic actuating mechanism

The inner end of the clamp 22 is provided with a cap screw 29. Mounted on this cap screw and retained by the head on the cap screw is a thrust pin or pitman having an eye 30 mounted on the stud and having its base attached to the thrust ring 31, which is attached by the key or screw 32 to the inner ball race 33 of the ball bearing, including the balls 34 and the outer race 35. The ring 31 is provided with a sleeve 36 which acts as a stop to halt the thrust ring in one position.

The ball bearing just described fits within the recess 37 in a piston 38 that has the sealing rings 39 and 39a and which reciprocates within a cylinder 40 bolted by the bolts 41 on the stationary crankcase 42. The cylinder carries suitable guide pins, not shown, which guide the piston 38 in its reciprocation to prevent rotation thereof. It will be understood that while the ball bearing race 35 reciprocates bodily with the piston 38, the race 33, and the thrust ring 31 with its pitman thrust member 30 both reciprocate and rotate. Therefore, the propeller is free to rotate with the shaft 7 of the engine but it may have the angularity of its blades adjusted according to the position of the hydraulic piston 38.

The control of the position of this piston in its movements is through the introduction and exhausting of hydraulic fluid into the cylinder 40 in the space 45, and the exhausting of fluid therefrom.

This is accomplished as follows. There is mounted on the face of the piston 38 a block 50 having a horizontal passageway 47 registering with a horizontal passageway 48 in the piston 38, the latter communicating with the space 45 behind the piston. The passageway 47 is in communication with a vertical passageway 49 in the block 50 which is intersected by a tube 51 which has a port 52 in registration with the passageway 49. It is apparent that the block 50 and the tube 51 move together with the piston 38. This tube is provided with diagonally disposed apertures 53 and 54, which register, respectively, with the passageway 55 which communicates with a source of fluid pressure and with the passageway 56 which extends to an exhaust. The end of the tube 51 is suitably closed as by a plug 57.

Surrounding the tube 51 is a reciprocating sleeve or servo-valve housing 51a which cooperates with the sleeve 51 to form a servo-valve. This valve member is connected by a linkage generally designated at 58 that extends into the cock pit of the plane to controls located adjacent to the pilot's position. The valve member comprises the aforementioned ports 55 and 56 which are connected by suitable piping, preferably flexible tubing, to a source of hydraulic pressure and to an exhaust, respectively.

The linkage generally designated at 58 consists of a lever 60 pivoted at 62 to the end cap of the shiftable valve member 51a. The upper end of the lever 60, as viewed in Figures 4 through 7, is pivoted at 64 to a linkage or flexible control means 66. The lower end of the lever 60, as viewed in Figures 4 through 7, is pivoted at 68 to a similar linkage or flexible control means 70. The pivot at 68 extends below the lower surface of the lever 60 and is abutted by the stop member 72 so that the control means at 70 is stopped in one direction of movement with the pivot 68 in its Figures 4, 5 and 6 position. It will be noted that the distance between the pivots 62 and 68 is substantially less than the distance between the pivots 62 and 64, so that movement of the control means at 66 actuates the valve member 51a in fine adjustment while movement of the control means at 70 actuates the valve member 51a quickly.

Referring now to Figure 1, it will be seen that the control means 66 leads through the fuselage of the plane and into the cockpit or cabin thereof generally designated at 74 and is connected with a shiftable control lever 76. This lever is positioned adjacent the pilot for easy manipulation, and may comprise a plate 78 inscribed with a suitable scale so that the pilot can determine the exact setting of the propeller.

The control means 70 also leads through the fuselage of the plane to the cockpit or cabin to be connected with an actuating lever 80. However, the lever 80 is positioned where normally it would not be grasped by the pilot in mistake for any other control lever. It is preferable that the lever 80 be mounted substantially as shown above and somewhat to the rear of the usual control levers and that there be provided therewith a plate as at 82 having a slot 84 by means of which, and the locking screw 86, the lever can be locked in any predetermined position. Normally, the lever will be locked with the pivot 68 stopped against the stop member 72. Then, when the plane is to land, and the pilot desires to utilize the braking effect of the propeller in negative pitch, the lock screw 86 may be loosened and the lever 80 shifted to actuate the piston 38 and to move the propeller blades into their negative pitch position.

In Figures 4, 5 and 6, the lever 60 is illustrated in several positions of positive pitch and it will be noted that the pivot 68 remains adjacent the stop member 72. In Figure 7, the lever 60 has been shifted to place the propeller in negative pitch and it will be noted that the pivot 68 has been moved a substantial distance away from the stop member 72.

Operation of the embodiment of Figures 1 through 8

In operation, assuming that the plane is about to take off, the pilot adjusts the lever 80 into position to bring the stop pin 68 against the stop bracket 72 as shown in Figures 5 and 6. The lever 80 is then locked in position by the lock nut 86. Thereafter, the pilot shifts the lever 76 into position to give the propeller blades a somewhat reduced positive pitch. This is accomplished as follows:

Shifting the lever 76 actuates the rod 66 and, through its pivotal connection at 64 with the lever 60, shifts the said lever by the pivot pin 68. This movement of the lever 60 shifts the valve housing 51a through its pivotal connection at 62 with the said lever.

Since the movement of the propeller blades is to be toward reduced pitch position the lever 60 will move from its Figure 6 position toward its Figure 5 position. This will move the valve body 51a rightwardly and open the port 53 to the pressure port 55. Pressure fluid will then flow through the hollow rod 51, port 52, and conduit 49, into the cylinder space 45. This will urge the piston 38 rightwardly and, through the links interconnecting the said piston with the propeller blades, rotate the blades toward reduced pitch position. Simultaneously, because of the rigid connection between the said piston and the hollow rod 51, the rod follows the valve body and again stops when the port 53 is closed off from the pressure port 55.

Should it be desired to place the propeller in negative pitch, the pilot will release the lever 80 by unscrewing the lock nut 86 and shift the lever 80 so as to move the lever 60 into the position shown in Figure 7. At this time the valve body 51 will be shifted leftwardly and again introduce pressure fluid through the port 53 to the piston 38 as mentioned above. This will shift the propeller blades past their center position and into negative pitch.

It will be apparent that at any time, prior to the shifting of the lever 80, the pilot has full control over the positioning of the propeller blades in all of their positive pitch positions. Thus, after the plane has taken off with the propeller blades in reduced pitch position, the pilot can shift them into increased positive pitch position for better flight conditions. However, due to the arrangement of the lever 76 it is not possible solely by that lever to shift the valve body 51a far enough to move the propeller blades into negative pitch. This can be accomplished only by shifting the lever 80.

Also, due to the fact that the connection of the lever 60 with the valve body 51a is much nearer the end of the said lever to which the rod 70 is attached than to the end to which the rod 66 is attached, the movement of the rod 66 results in fine adjustment of the valve body 51a, while movement of the rod 70 will cause coarse adjustment or rapid movement of the body 51a.

Second embodiment of hydraulic actuating mechanism

In Figures 9 through 13 there is shown a somewhat modified arrangement of control valve and actuating linkage by means of which the propeller pitch is controlled. In these views similar parts bear similar numbers with the addition of a subscript b.

Referring to Figures 9 through 12, it will be noted that the space 45b behind the piston 38b is connected by a passage 88 in the crankcase of the engine with the mid-point 90 of the stationary valve casing 92. The valve casing 92 also comprises a port 94 connected to drain and a port 96 connected with a supply of pressure fluid.

The valve casing 92 is rigidly secured to the crankcase of the engine as by the bolts 98, and the port 96 communicates with the passage 100 in the crankcase.

Reference to Figure 10 will reveal the passage 100 communicates with a second passage 102 which is supplied with pressure fluid from any suitable source, preferably a pump which draws oil from the crankcase of the engine. There is a check valve 104 positioned between the passages 100 and 102 which is responsive to the fluid pressure in the passage 102 for permitting the flow of fluid into the passage 100 but prevents return flow.

Reciprocably mounted in the casing 92 is a valve member 106 which includes the groove portion 108 which exactly spans the distance between the ports 94 and 96.

The valve member 106 is connected by the pin 110 with a lever 112 which is slotted as at 114 to receive the said pin. The lever 112 has its upper end, as viewed in Figures 11, 12 and 13, pivoted at 116 to a link 118.

The lower end of the lever 112 is pivoted at 120 to a lever 122 which has its opposite end connected by the pivot 124 of a link 126. Between the pivots 120 and 124, and substantially closer to the former, is a pivot point 128 to which is connected the drag link 130. The drag link 130 in turn is pivoted at 132 to the block 134 which is fastened to the face of the piston 38b as is indicated at 136 in Figure 9.

A stop member 138 is secured to the engine crankcase in any suitable manner and is positioned to abut the link 118 or the pivot 116. The link 118 is for the purpose of adjusting the propeller in negative pitch while the link 126 adjusts the propeller in positive pitch. It will be noted from Figures 12 and 13 that the link 126 and lever 122 provide for fine adjustment of the propeller actuating piston while the link 118 and lever 112 provide for rapid adjustment of the piston.

It will be noted that actuation of either of the links 126, 118 move the valve member 106 relative to the valve casing 92, and that this movement actuates the piston 38b so that the lever system 112, 122 is moved in a direction to return the valve member and valve casing to their original relative position, whereupon further movement of the piston stops.

*Operation of the embodiment of Figures 9 through 13*

The operation of the embodiment of Figures 9 through 13 is as follows:

The link 126 corresponds to the rod 66 in the first embodiment in that it adjusts the propeller blades in fine adjustment in positive pitch. The link 118 corresponds to the rod 70 in that it effects adjustment of the propeller blades in negative pitch.

Movement of the link 126 rightwardly will cause pivoting movement of the rod 122 about the pivot 128 which is joined by the link 130 with the block 134 carried on the face of the actuating piston 38b. The lower end of the link 122 thus moves leftwardly and causes the lever 112 to pivot in a clockwise direction about its connection with the link 118. This moves the valve plunger 106 leftwardly and opens the port 90 to the port 96. Pressure fluid is thus admitted to drive the piston 38b rightwardly and to reduce the pitch of the propeller blades. Rightward movement of the piston 38b will carry the block 134 rightwardly and, through the link 130, will move the lower end of the lever 122 rightwardly. This will carry the lever 112 in a counterclockwise direction about its pivotal support with the link 118 and return the valve member 106 to its original position relative to the valve body.

It will be apparent that movement of the link 126 is operable to cause fine adjustment in the pitch of the propeller blades between predetermined limits. If, now, the link 118 is actuated, it will pivot the lever 112 about its pivotal connection at 120 with the lever 122. This will result in a rapid movement of the valve plunger 106 and a correspondingly rapid movement of the piston 38b to shift the propeller blades into negative pitch position. It will be apparent that movement of the link 118 will be leftwardly to accomplish this, whereas movement of the link 126 will accomplish movements of the propeller blades toward reduced pitch position and thus toward the right.

It will be apparent that this invention provides an approved control means for use in connection with an adjustable pitch propeller by providing for a fine adjustment in positive pitch and an adjustment operable for moving the propeller quickly into negative pitch. This invention provides for the further improvement of so locating the controlling means in the plane cabin that there is no likelihood of the pilot accidentally shifting the propeller into negative pitch when he desires to make a change in the positive pitch adjustment thereof. The mechanism employed for accomplishing the foregoing results is relatively simple, requiring a minimum of parts and being constructible at small expense.

It will be understood that this invention is susceptible to modification in order to adopt it to different usages and conditions and, accordingly, it is desired to comprehend such modifications within this invention as may fall within the scope of the appended claims.

I claim:

1. In combination; a propeller having blades rotatable on their axis; centrifugal means continuously urging said blades toward increased positive pitch; a fluid operable plunger connected to urge said blades toward negative pitch position; a servo valve connected to supply fluid to said plunger or to exhaust said plunger, said valve having a movable portion; first and second independent control levers for actuating the movable portion of said valve; and a differential mechanism connecting said levers with the said movable portion whereby the first thereof moves said member in fine adjustment and the other thereof moves said member rapidly.

2. In combination; an adjustable pitch propeller having means continuously urging the baldes thereof toward maximum positive pitch position; fluid operable means connected to actuate the blades toward negative pitch position; a follow-up servo valve controlling the supply of actuating fluid to said fluid operable means; first and second separate and independent control levers for controlling said servo valve; and linkage means connecting said levers with said servo valve; said linkage means providing substantially different ratios of movement between said levers and said servo valve whereby one of said levers can adjust said valve in fine adjustment and the other thereof in coarse adjustment.

3. In combination; a variable pitch propeller; means continuously urging said propeller toward maximum positive pitch position; a hydraulic plunger connected to move the propeller blades through neutral and into negative pitch position; a valve comprising a pair of relatively movable parts which control the supply of fluid to and from said plunger; means connecting said valve with said plunger whereby movement of said piston is brought about by relative movement of said parts to return said valve parts to their initial position; a lever pivoted to one of said valve parts; and control rods for actuating the said one of said valve parts through said lever also connected with said lever at different distances from said valve member for obtaining different ratios of movement thereof.

4. In combination with a variable pitch propeller having means continuously urging the blades thereof toward maximum positive pitch; hydraulic means including a follow-up servo valve for moving said blades through neutral and into negative pitch position; an arm connected with one part of said valve and having a short extension to one side thereof and a long extension to the other side thereof; a first control lever adjacent the pilot's position connected to the end of said arm on the long side thereof; and a second control lever adjacent the pilot's position but remote from the first lever connected to said arm on the short side thereof.

5. In combination with a variable pitch propeller having means continuously urging the blades thereof toward maximum positive pitch; hydraulic means including a follow-up servo valve for moving said blades through neutral and into negative pitch position; an arm connected with one part of said valve and having a short extension to one side thereof and a long extension to the other side thereof; a first control lever adjacent the pilot's position connected to the end of said arm on the long side thereof; a second control lever adjacent the pilot's position but remote from the first lever connected to said arm on the short side thereof; and means of locking said second lever in position.

6. In combination with a variable pitch propeller having means continuously urging the blades thereof toward maximum positive pitch; hydraulic means including a follow-up servo valve for moving said blades through neutral and into negative pitch position; an arm connected with one part of said valve and having a short extension to one side thereof and a long extension to the other side thereof; a first control lever adjacent the pilot's position connected to the end of said arm on the long side thereof; a second control lever adjacent the pilot's position but remote from the first lever connected to said arm on the short side thereof; stop means to abut and stop the said short side of said arm at a predetermined position; and locking means to lock said second control lever in position.

7. In combination with a variable pitch propeller having the blades thereof continuously urged toward maximum positive pitch; hydraulic means including a piston connected to move said blades through neutral and into negative pitch position; a valve having relatively movable parts hydraulically connected to control the supply of fluid to and from said piston; a first lever pivoted intermediate its ends to one of said valve parts; a second lever pivoted at one end to the end of said first lever; a first control arm adjacent the pilot's position connected with the free end of said second lever; a second control arm spaced from said first control arm connected with the free end of said first lever; and means for returning said valve parts to their original relative position by said piston comprising a link connected between the said piston and one of said levers adjacent their connecting pivot.

8. In combination with a variable pitch propeller having the blades thereof continuously urged toward maximum positive pitch; hydraulic means including a piston connected to move said blades through neutral and into negative pitch position; a valve having relatively movable parts hydraulically connected to control the supply of fluid to and from said piston; a first lever pivoted intermediate its ends to one of said valve parts; a second lever pivoted at one end to the end of said first lever; a first control arm adjacent the pilot's position connected with the free end of said second lever; a second control arm spaced from said first control arm connected with the free end of said first lever; and follow-up means for said valve comprising a drag link connected between said piston and said second lever adjacent to but spaced from its pivotal connection with said first lever.

DAVID BIERMANN.

REFERENCES CITED

The following references are of record in the file of this patent:

UNITED STATES PATENTS

| Number | Name | Date |
|---|---|---|
| 85,779 | Atkins | Jan. 12, 1869 |
| 1,154,591 | Dodge | Sept. 21, 1915 |
| 1,630,810 | Simpson | May 31, 1927 |
| 1,816,787 | Moss | July 28, 1931 |
| 1,834,773 | Fellmann | Dec. 1, 1931 |
| 1,990,814 | Castro | Feb. 12, 1935 |
| 2,032,254 | Caldwell | Feb. 25, 1936 |
| 2,197,664 | Mack | Apr. 16, 1940 |
| 2,216,416 | Mader | Oct. 1, 1940 |
| 2,233,468 | Barthel | Mar. 4, 1941 |
| 2,234,003 | Hruska | Mar. 4, 1941 |
| 2,284,687 | Schimanek | June 21, 1942 |
| 2,425,261 | Murphy et al. | Aug. 5, 1947 |